(12) United States Patent
Jin et al.

(10) Patent No.: US 8,754,547 B2
(45) Date of Patent: Jun. 17, 2014

(54) CONTROLLER FOR HYBRID ENERGY STORAGE

(75) Inventors: Chunlian Jin, Richland, WA (US); Ning Lu, Richland, WA (US); Shuai Lu, Richland, WA (US); Yuri V. Makarov, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 454 days.

(21) Appl. No.: 12/948,337

(22) Filed: Nov. 17, 2010

(65) Prior Publication Data

US 2012/0119579 A1    May 17, 2012

(51) Int. Cl.
*H02J 1/00*  (2006.01)
*H02J 3/12*  (2006.01)
*H02J 1/10*  (2006.01)
*G05D 5/00*  (2006.01)
*G05D 9/00*  (2006.01)

(52) U.S. Cl.
USPC ............... 307/103; 307/60; 307/43; 700/297; 700/298

(58) Field of Classification Search
CPC combination set(s) only.
See application file for complete search history.

(56) References Cited

U.S. PATENT DOCUMENTS

| | | | |
|---|---|---|---|
| 5,929,538 A * | 7/1999 | O'Sullivan et al. | 307/66 |
| 2005/0077881 A1 | 4/2005 | Capp et al. | |
| 2005/0122652 A1 | 6/2005 | Richardson et al. | |
| 2010/0090532 A1 * | 4/2010 | Shelton et al. | 307/46 |
| 2011/0080044 A1 * | 4/2011 | Schmiegel | 307/23 |
| 2011/0148360 A1 * | 6/2011 | Lee | 320/134 |
| 2011/0163603 A1 * | 7/2011 | Chou et al. | 307/66 |

FOREIGN PATENT DOCUMENTS

WO   WO2007/104167   9/2007
WO   WO2011/026901   3/2011

OTHER PUBLICATIONS

Gyuk et al., "Flywheel-based Frequency Regulation Demonstration Projects for CEC, Nyserda, & DOE," *DOE Energy Storage Systems Research Program Annual Peer Review*, Nov. 2006.
Kirby et al., "Generator Response to Intrahour Load Fluctuations," *IEEE Transactions on Power Systems*, vol. 13 #4, PE-627-PWRS-0-12-1997, 1997, 7 pages.
Makarov et al., "Assessing the Value of Regulation Resources Based on Their Time Response Characteristics," PNNL Report, PNNL 52182, prepared for CERTS and California Energy Commission, Dec. 2007, 83 pages.
Makarov et al., "Impacts of Wind Generation on Regulatin and Load Following Requirements in the California System," *Power and Energy Society General Meeting—Conversion and Delivery of Electrical Energy in the 21st Century*, Jul. 2008, 9 pages.

(Continued)

*Primary Examiner* — Jared Fureman
*Assistant Examiner* — Aqeel Bukhari
(74) *Attorney, Agent, or Firm* — Klarquist Sparkman, LLP (57) ABSTRACT

A controller is disclosed for hybrid systems providing power to an electrical power grid. The controller reduces wear on hybrid systems by having only a fast unit tuned to track fluctuations of a regulation signal in a normal mode of operation. By contrast, the slow unit does not track fluctuations in the regulation signal in the normal mode of operation, which reduces wear on the slow unit. The normal mode of operation is defined by an energy range of the fast unit. Energy band parameters associated with the energy range can be dynamically modified in order to optimize the efficiency of the hybrid system.

18 Claims, 11 Drawing Sheets

(56) References Cited

OTHER PUBLICATIONS

Makarov et al., "Wide-Area Energy Storage & Management System to Balance Intermittment Resources in the BPA and CAISO Areas," *California Energy Commission Staff Workshop*, Oct. 2007.

Nyeng et al., "Coordinated Multi-Objective Control of Regulating Resources in Multi-Area Power Systems with Large Penetration of Wind Power Generation," *7th International Workshop on Large Scale Integration of Wind Power and on Transmission Networks for Offshore Wind Farms*, May 2008, 6 pages.

"Real Power Balancing Control Performance," NERC Standard BAL-001-0a, Approved by Board of Trustees: Oct. 23, 2007, 7 pages.

Yang et al., "On the Use of Energy Storage Technologies for Regulation Services in Electric Power Systems with Significant Penetration of Wind Energy," *5th International Conference on European Electricity Market*, May 2008, 6 pages.

Duong Tran et al., "Energy management and dynamic control in Composite Energy Storage System for micro-grid applications," IECON 2010—*36th Annual Conference on IEEE Industrial Electronics Society*, IEEE, Piscataway, NJ, USA, Nov. 7, 2010, pp. 1818-1824.

International Search Report and Written Opinion from PCT/US2011/060242, dated Feb. 14, 2013, 13 pages.

\* cited by examiner

SOFTWARE 280 IMPLEMENTING
DESCRIBED TECHNIQUES AND TOOLS

CONTROLLER FOR HYBRID ENERGY STORAGE

FIELD

The present application relates to energy storage for a power grid, and, particularly, to using multiple energy devices having different response times in combination for energy production.

BACKGROUND

Grid energy storage (also called large-scale energy storage) refers to the methods used to store electricity within an electrical power grid. Electrical energy is stored during times when production (from power plants) exceeds consumption. The excess energy stored can be used at times when consumption exceeds production. Using such techniques, electricity production need not be drastically scaled up and down to meet consumption.

There are a variety of forms used for energy generation and storage. Some well-known devices include hydroelectric dams (using a water reservoir), combined cycle units (e.g., combined gas and steam turbines), gas turbines, coal units, pumped storage hydro (pumping water to a high elevation storage reservoir), flywheels (storing energy using a rotational disc), compressed air, batteries (e.g., sodium-sulfur, lithium-ion, flow, etc.), super capacitor bank, etc. Intermittent energy sources, such as wind turbines, photovoltaics, and tidal, can also provide energy to the grid, but such sources are by nature unpredictable, as production can vary not only seasonally and regionally, but from minute to minute.

Some such forms of energy storage and energy generation react slowly to changes in an input regulation signal, while others react quickly. For example, hydroelectric, coal, gas and combined cycle units are traditionally very slow in reacting to a change in regulation signals (1-6 minutes to exceed 90% capacity), while batteries and flywheels can react much faster (less than 1 minute, but can be 5 seconds or less to exceed 90% capacity), and, in some cases, nearly instantaneously.

Hybrid energy storage systems combine both fast and slow units. Based on a regulation input signal, a control algorithm determines the optimal distribution of the requested regulation on the participating units. The algorithm calculates operating points for each unit, which are then supplied to the unit models. For combined hydro and flywheel models, the set point is modified dynamically to compensate for hydro plant delays.

Nonetheless, the control algorithm still suffers in that the slow unit tracks the regulation signal substantially all of the time. Such tracking places a high burden and wear on the slow units.

Thus, a more efficient controller is desirable for hybrid energy storage systems.

SUMMARY

The present application provides a controller that reduces wear and tear on hybrid systems by having only a fast unit tuned to track fluctuations of a regulation signal in a normal mode of operation. By contrast, the slow unit does not track fluctuations in the regulation signal in the normal mode of operation, which reduces wear and tear on the slow unit.

In one embodiment, a method for a regulation service is provided that uses a first energy unit and a second energy storage unit. The first energy unit can be a storage unit, such as pumped hydro storage, or an energy generation unit, such as a hydroelectric dam or a gas turbine. The second energy storage unit can be a fast unit, such as a battery or a flywheel. If the second energy storage unit is within a desired energy range, it is used to substantially track changes in the regulation signal while the first energy unit remains at a substantially constant power output.

In another embodiment, only when the second energy storage unit state of charge falls below or above threshold levels does the slow unit react and track the regulation signal, which helps to charge or discharge the second unit.

In yet another embodiment, energy band parameters associated with the threshold levels can be dynamically modified in order to improve the regulation performance, optimize the efficiency of the hybrid system, and reduce wear and tear on the hybrid system.

The combined hybrid system can provide faster and more accurate regulation service than a single unit acting on its own. Additionally, a fast unit can be tuned to significantly reduce the adjustments of a slow unit's regulation curve, thereby extending the life of the slow unit and reducing overall cost of power. Additionally, the fast unit can maintain an output of the slow unit at substantially near the most efficient operating point. By proper selection of the fast unit's energy bands, the fast unit's energy can be adjusted to efficiently use the entire available energy range.

The foregoing and other objects, features, and advantages of the invention will become more apparent from the following detailed description, which proceeds with reference to the accompanying figures.

DETAILED DESCRIPTION

Figure 1:
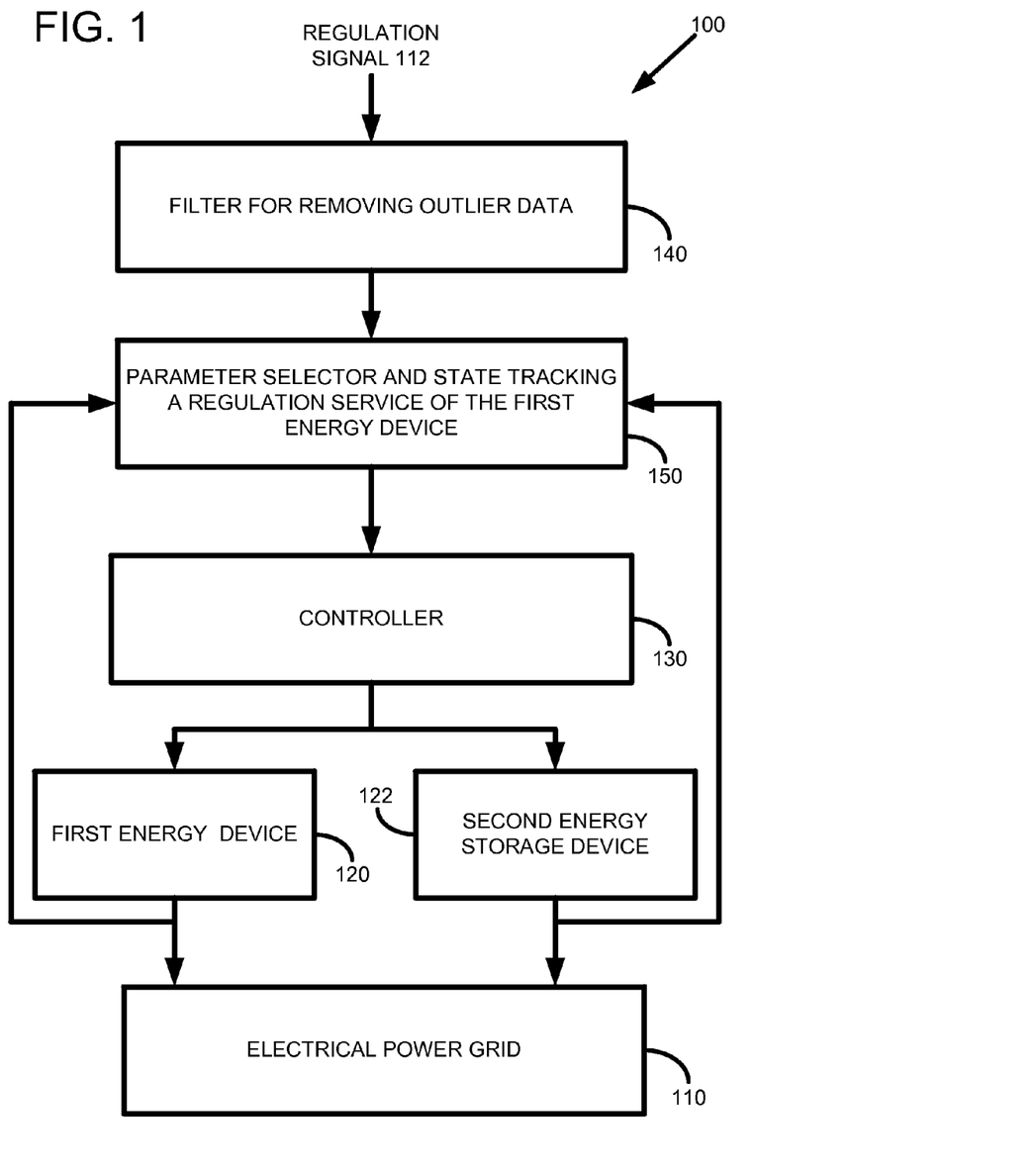
FIG. 1 is a system diagram showing a hybrid energy system.

FIG. 1 shows a hybrid energy storage system 100 used to provide a regulation service in an electrical power grid 110. A regulation signal 112 indicates a change of output needed in the hybrid energy storage system in order to meet an imbalance on an electrical power grid. Two energy devices 120, 122 provide energy to the grid 110 and are coordinated by a controller 130 in order to track the regulation signal. The first energy device 120 can be considered a slow unit, which can be a slow energy storage unit or conventional generation unit. This group includes one or more of the following: a pumped hydroelectric storage, hydroelectric, combined cycle, gas turbine, coal unit, etc. Generally, the response time of a slow unit is greater than 1 minute, but such response times can vary. The second energy storage device 122 can be an energy storage unit with a fast response. This group includes one or more of the following: a flywheel, sodium-sulfur battery bank, lithium-ion battery bank, flow battery bank, super capacitor bank etc. Generally, the response time of a fast unit is less than 1 minute, and can be nearly instantaneous. Other known or future developed slow and fast units can be used. In any event, the first and second devices are of different types with different response times. The controller 130 includes an algorithm for tracking the regulation signal and uses the fast unit, when it has sufficient energy, to absorb or track changes in the regulation signal, while leaving the slow unit at substantially constant power. In this way, the response time can be faster and wear and tear on the slow unit is avoided. If the fast unit is outside of a necessary energy range, then the slow unit can be used to charge or discharge the fast unit. Additionally, the slow unit can be used to absorb some of the changes in the regulation signal in combination with the fast unit. The regulation signal 112 can be received by the hybrid energy storage system 100 and filtered by filter 140 to remove outlier data and/or noise. Filters for removing outlier data are well-known in the art and are used to remove corrupted data or data considered not valid from the regulation signal. After outlier data is removed from the regulation signal, it is passed to a parameter selector and state tracking unit of the first energy device 150. As further described below, the parameter selector 150 can be used to dynamically modify energy bands in order to control a distribution of power output between the first energy device 120 and the second energy storage device 122. The energy bands define what amount of energy in the second energy storage device is considered a desired range. The desired range can be determined based upon many factors. For example, the parameter selector analyzes the regulation signal and feedback from the outputs of the first energy device 120 and the second energy storage device 122. The parameter selection can also change based on characteristics of the regulation signal, which can vary regionally and seasonally. For example, wind energy can vary based on season. The state tracking of the regulation service changes depending on whether the first energy device is assisting in charging, discharging, or neutral, for the second energy storage unit. The state tracking of the regulation service and the current energy level of the second energy storage device are used to determine the distribution of power provided by the first energy device and the second energy storage device, as further described below.

Figure 2:
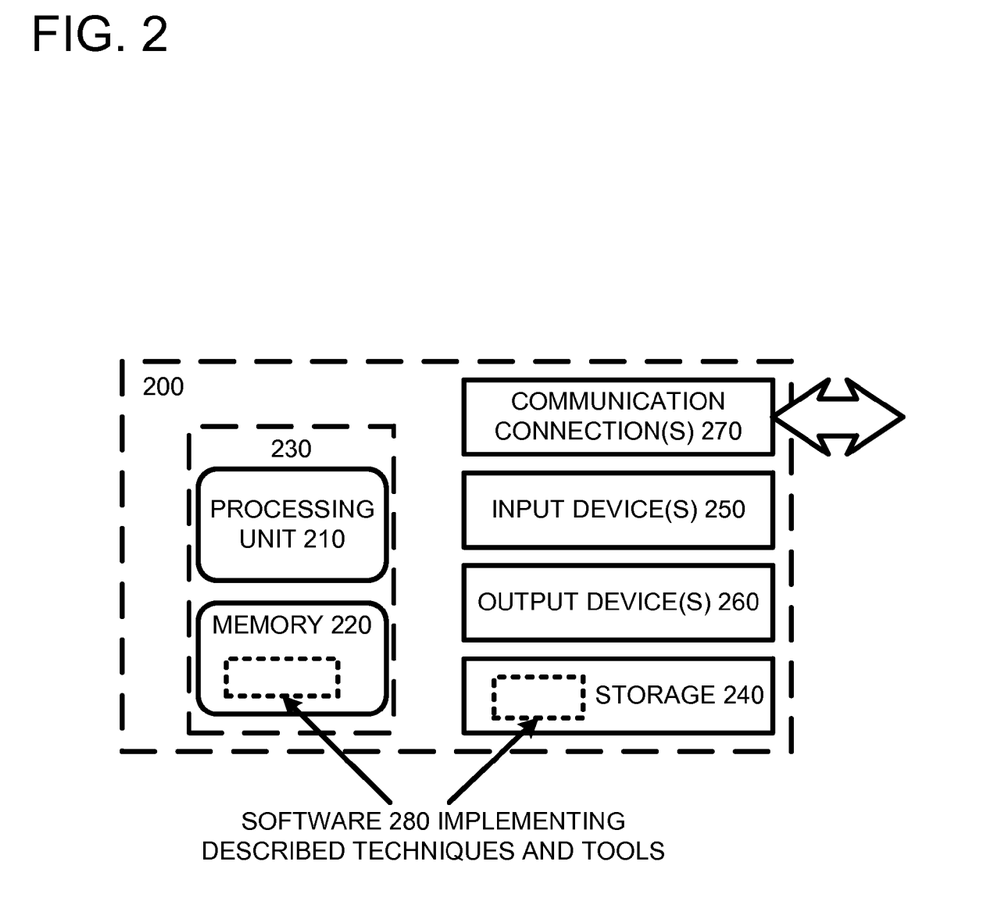
FIG. 2 is a controller that can be used in the hybrid energy system of FIG. 1.

FIG. 2 illustrates a generalized example of a suitable controller 200 in which the described technologies can be implemented. The controller is not intended to suggest any limitation as to scope of use or functionality, as the technologies may be implemented in diverse general-purpose or special-purpose computing environments.

With reference to FIG. 2, the controller 200 can include at least one processing unit 210 (e.g., signal processor, microprocessor, ASIC, or other control and processing logic circuitry) coupled to memory 220. The processing unit 210 executes computer-executable instructions and may be a real or a virtual processor. The memory 220 may be volatile memory (e.g., registers, cache, RAM), non-volatile memory (e.g., ROM, EEPROM, flash memory, etc.), or some combination of the two. The memory 220 can store software 280 implementing any of the technologies described herein.

The controller may have additional features. For example, the controller can include storage 240, one or more input devices 250, one or more output devices 260, and one or more communication connections 270. An interconnection mechanism (not shown), such as a bus or network interconnects the components. Typically, operating system software (not shown) provides an operating environment for other software executing in the controller and coordinates activities of the components of the controller.

The storage 240 may be removable or non-removable, and can include magnetic disks, magnetic tapes or cassettes, CD-ROMs, CD-RWs, DVDs, or any other computer-readable media that can be used to store information and which can be accessed within the controller. The storage 240 can store software 280 containing instructions for controlling the first and second energy storage devices.

The input device(s) 250 can be a touch input device such as a keyboard, mouse, pen, or trackball, a voice input device, a scanning device, or another device. The output device(s) 260 may be a display, printer, speaker, CD- or DVD-writer, or another device that provides output from the controller. Some input/output devices, such as a touchscreen, may include both input and output functionality.

The communication connection(s) 270 enables communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, microwaves, infrared, acoustic, or other carrier.

Figure 3:
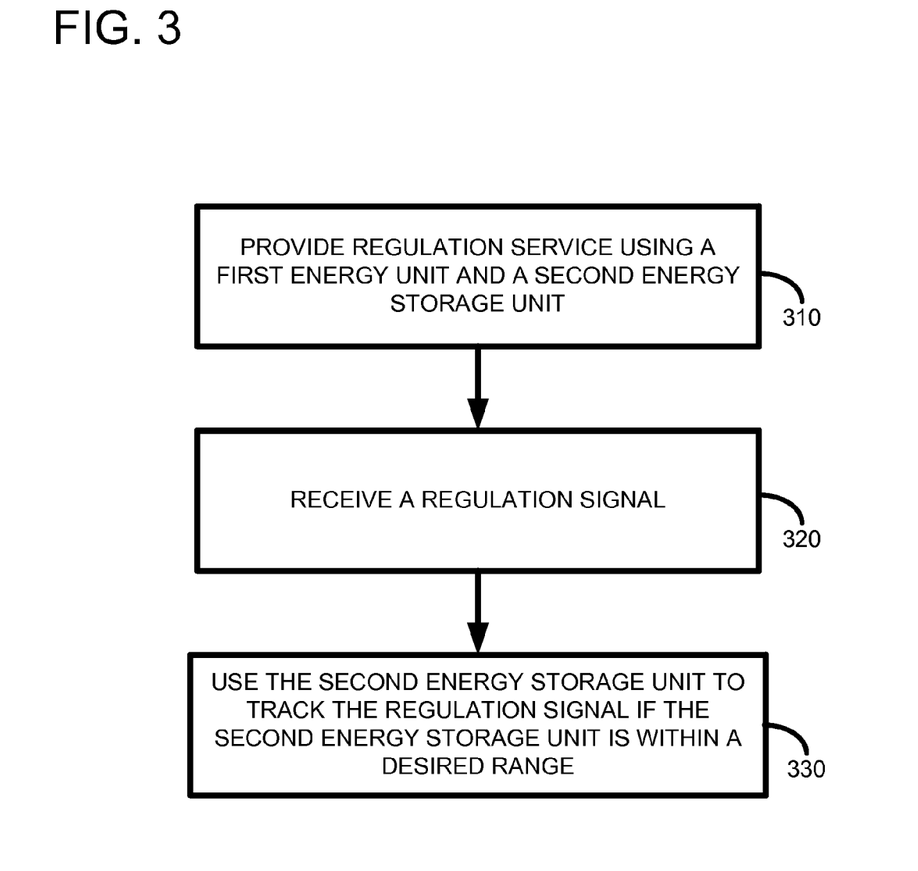
FIG. 3 is a flowchart of a method for providing a regulation service to an electrical power grid.

FIG. 3 is a flowchart of a method for providing the regulation service. In process block 310, a regulation service is provided by using a first energy unit and a second energy storage unit. The first energy unit can be unit 120 from FIG. 1 and the second energy storage unit can be unit 122. In process block 320, a regulation signal is received indicating a change of output needed to meet an imbalance on the electrical power grid. In process block 330, the second energy storage unit tracks the change in the regulation signal, while the first energy unit maintains substantially constant power. This is a desired mode of operation because the second energy storage unit is faster and can track the regulation much more accurately and efficiently. However, the second energy storage unit should be within a desired energy range in order to track the regulation signal. If it is undercharged or overcharged, it can be necessary for the first energy unit to absorb some of the tracking responsibility so that both the first and second units together track the regulation signal. The determination regarding the distribution of power is made by the controller 130.

Figure 4:
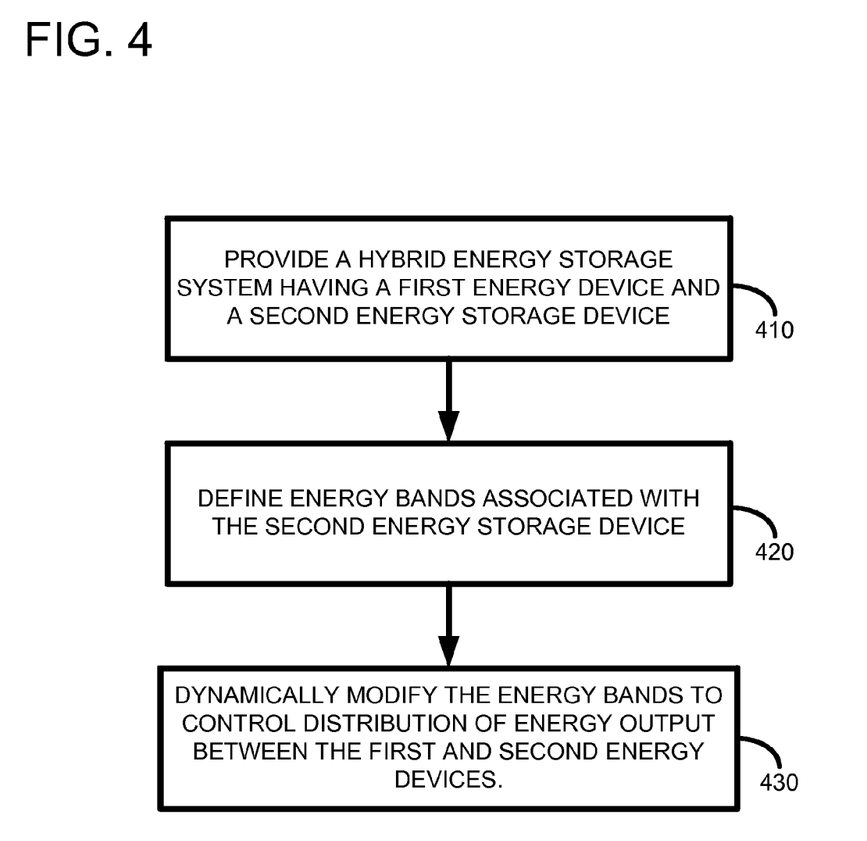
FIG. 4 is a flowchart of a method for dynamically modifying energy bands in providing a regulation service.
Figure 5:
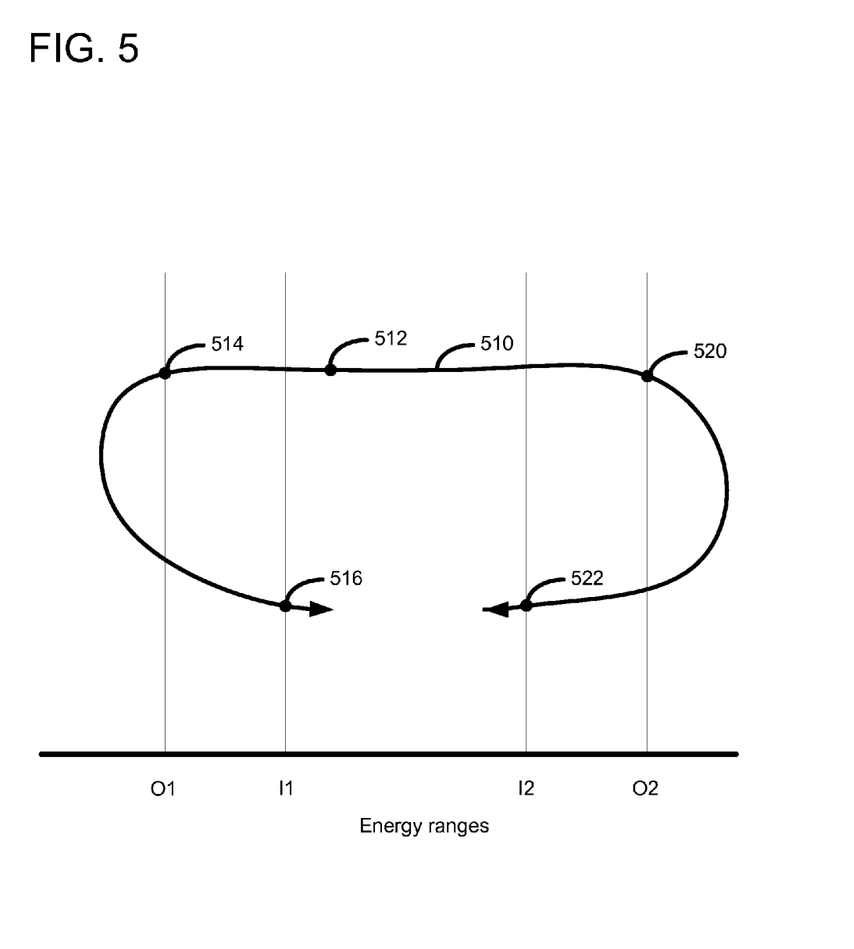
FIG. 5 is an example showing energy bands used in the regulation service.

FIG. 4 is a flowchart of a method illustrating another embodiment wherein the energy bands associated with the second energy storage unit are dynamically modified. In process block 410, a hybrid energy storage system is provided. In process block 420, the energy bands are defined as associated with the second energy storage device. For example, FIG. 5 shows four defined energy bands O1 (lower outer), I1 (lower inner), I2 (upper inner), and O2 (upper outer). In process block 430, the energy bands can be dynamically modified to control distribution of the energy output between the first and second energy devices. For example, the energy bands can be initially set to predetermined values, such as 10%, 30%, 60% and 90%, for O1, I1, I2, and O2, respectively. After that, the energy bands can be dynamically modified based on feedback signals provided by the outputs of the first and second energy storage devices 120, 122 and the input regulation signal. As previously described, the controller 130 can then use the dynamically changing parameters together with the state of the regulation service in order to determine how to distribute power to track the regulation signal. Examples are provided in FIGS. 5-11 on how to make the distribution.

FIG. 5 is an example energy band diagram. The amount of energy of the second energy storage device is considered, as well as the direction of movement (which is related to the regulation status of the slow unit), as indicated by energy flow arrow 510. The energy bands are defined by outer bands O1, O2, and by inner bands I1, I2. Although four bands are shown, any number of bands can be used, such as 2, 3, 4, 5, etc. By way of example, at a point 512, a fast unit can be 50% charged, but in a state of discharging until it reaches point 514. At this point, as it continues to discharge, it moves below a lower threshold O1. The controller then initiates the slow unit 120 to begin assisting in charging the fast unit until it reaches a point 516. At that point, the slow unit discontinues charging, as the fast unit is within the desired range of between I1 and I2. As a second example, starting from the point 512, the fast unit can also be in a state of charging until it reaches point 520. At this point, the fast unit has exceeded an energy threshold and the controller initiates that the slow unit assists in discharging the fast unit until it reaches point 522. At that point, the controller switches the slow unit back to a neutral state.

Figure 6:
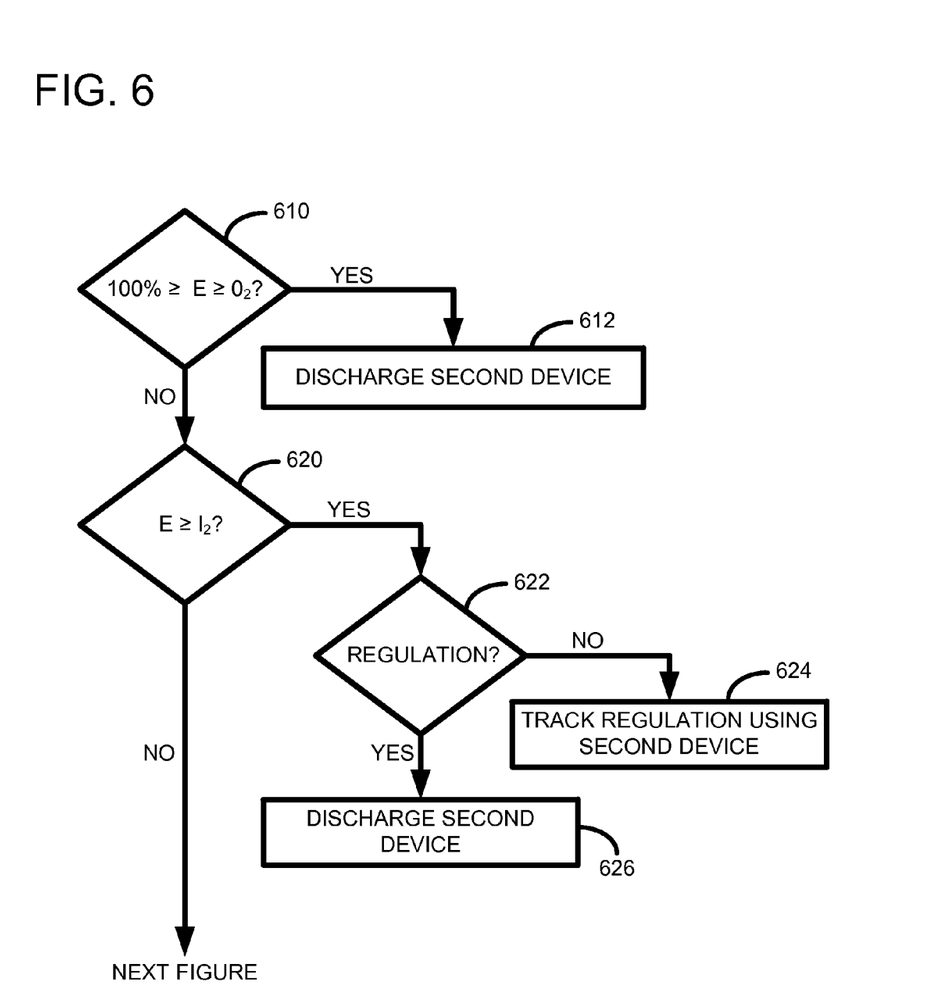
FIG. 6 is a detailed flowchart showing different actions performed based on the state of energy in the hybrid system.
Figure 7:
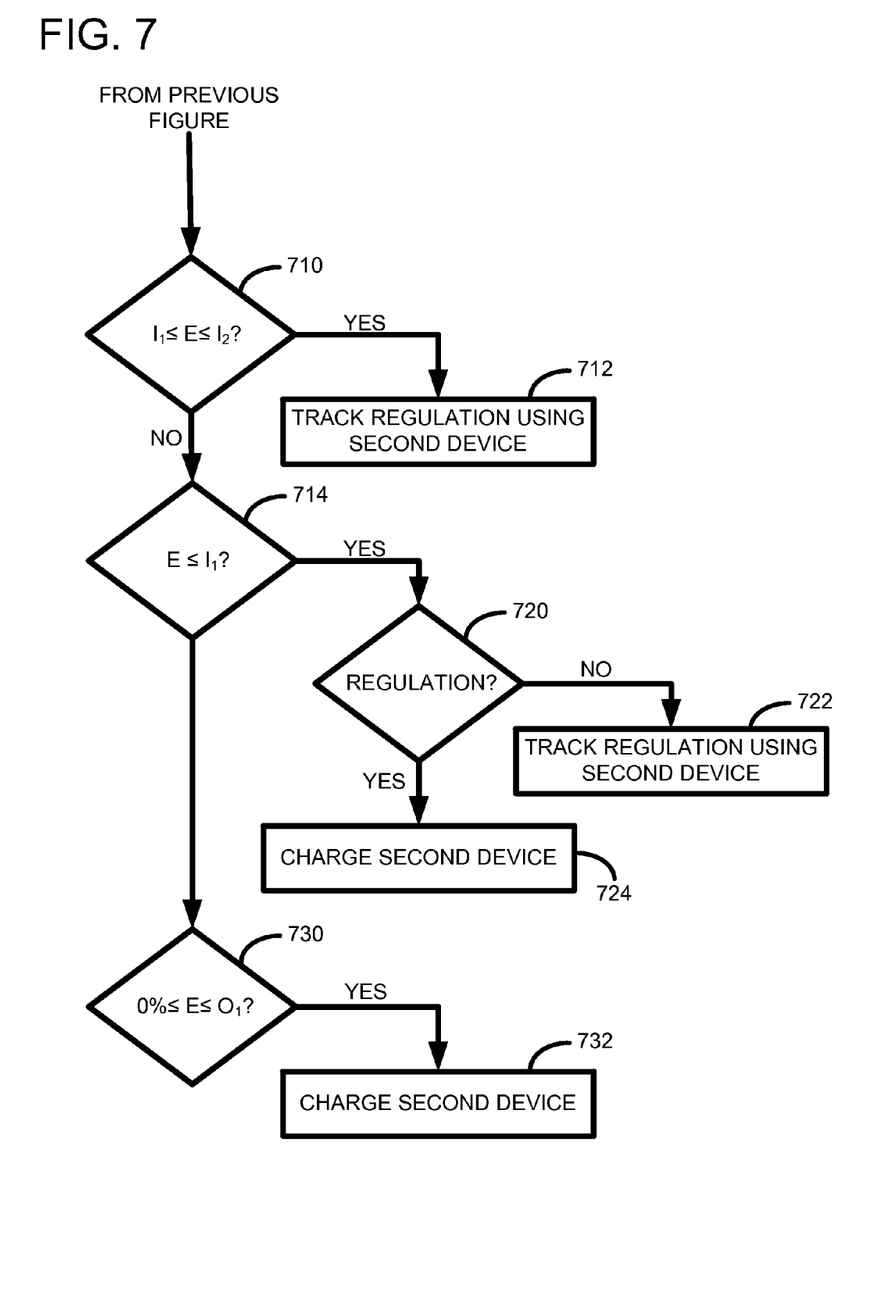
FIG. 7 is a continuation of the flowchart of FIG. 6.

FIGS. 6 and 7 show flow diagrams of a top-level case statement that can be used by the controller in providing the regulation service. In decision block 610, a check is made whether the energy stored in the fast unit is less than or equal to a maximum of 100%, but greater than or equal to the upper energy band threshold O2. If yes, in process block 612, the second energy storage device 122 is discharged. For example, returning to FIG. 5, the second energy storage device can move from the point 520 towards point 522. If decision block 610 is answered in the negative, a second decision block 620 is used to determine whether the energy level of the fast unit is greater than or equal to the inner energy band threshold I2. If yes, in decision block 622, a determination is made whether the slow unit is providing regulation. If not, in process block 624, a normal mode of operation is used wherein the regulation signal is tracked using the second device. Otherwise, if the slow unit is providing regulation, then the first energy device 120 assists the second energy storage device to discharge in process block 626.

If decision block 620 is answered in the negative, the flow continues at process block 710 in FIG. 7 wherein an energy level of the fast unit is checked to determine whether it is between the inner energy bands I1 and I2. If so, this is the desired energy range for the fast unit and, in process block 712, the fast unit is used to track the regulation signal, while the slow unit remains at substantially constant power output, meaning that the controller does not attempt to modify the power output of the slow unit in order to track the regulation signal. If decision block 710 is answered in the negative, then in decision block 714, an energy level of the fast unit is checked to determine whether it is less than the inner energy band threshold I1. If so, in decision block 720, a check is made to determine whether the slow unit is providing regulation. If not, then the fast unit tracks the regulation signal while the slow unit remains at a substantially constant power output (process block 722). If yes, then the slow unit assists in charging the fast unit so that tracking the regulation signal is shared between both the slow and fast units (process block 724). If decision block 714 is answered in the negative, then in decision block 730, a determination is made whether the energy is between 0% and the energy band threshold O1. If so, then the slow unit assists the fast unit to charge, so tracking the regulation signal is shared between both the slow and fast units (process block 732).

Figure 8:
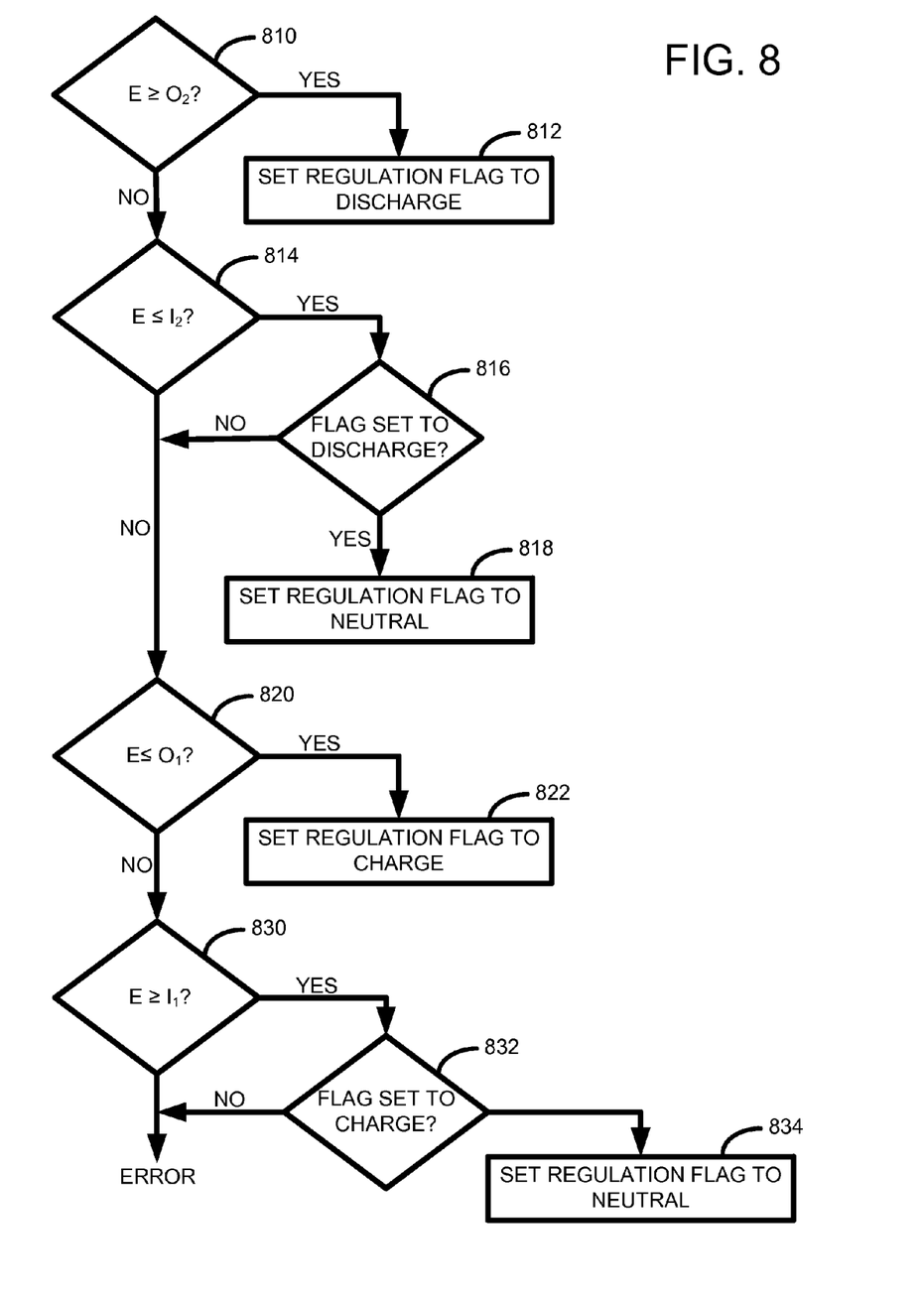
FIG. 8 is a flowchart of a method for determining a regulation status of a slow unit.

FIG. 8 is a flowchart for determining the regulation status of the slow unit and setting the regulation flag to a proper value based on the energy level of the fast unit. The regulation flag is used in FIGS. 6 and 7 to determine whether the slow unit is providing regulation. In decision block 810, a determination is made whether an energy level of the fast unit exceeds the upper energy band threshold O2. If so, the regulation flag is set to discharge (process block 812). Otherwise, in decision block 814, a determination is made whether the energy level of the fast unit is less than the inner energy band I2. If so, a check is made in decision block 816 whether the flag is already set to discharge. If so, the regulation flag is set to neutral (process block 818). In decision block 820, a determination is made whether the energy level of the fast unit is less than the lower energy band threshold O1. If so, the regulation flag is set to charge in process block 822. If not, the flow continues to decision block 830, wherein a determination is made whether the energy level of the fast unit exceeds the lower energy threshold I1. If so, a check is made in decision block 832 whether the regulation flag is set to charge. If so the regulation flag is changed to neutral. Otherwise, an error condition is signaled.

Figure 9:
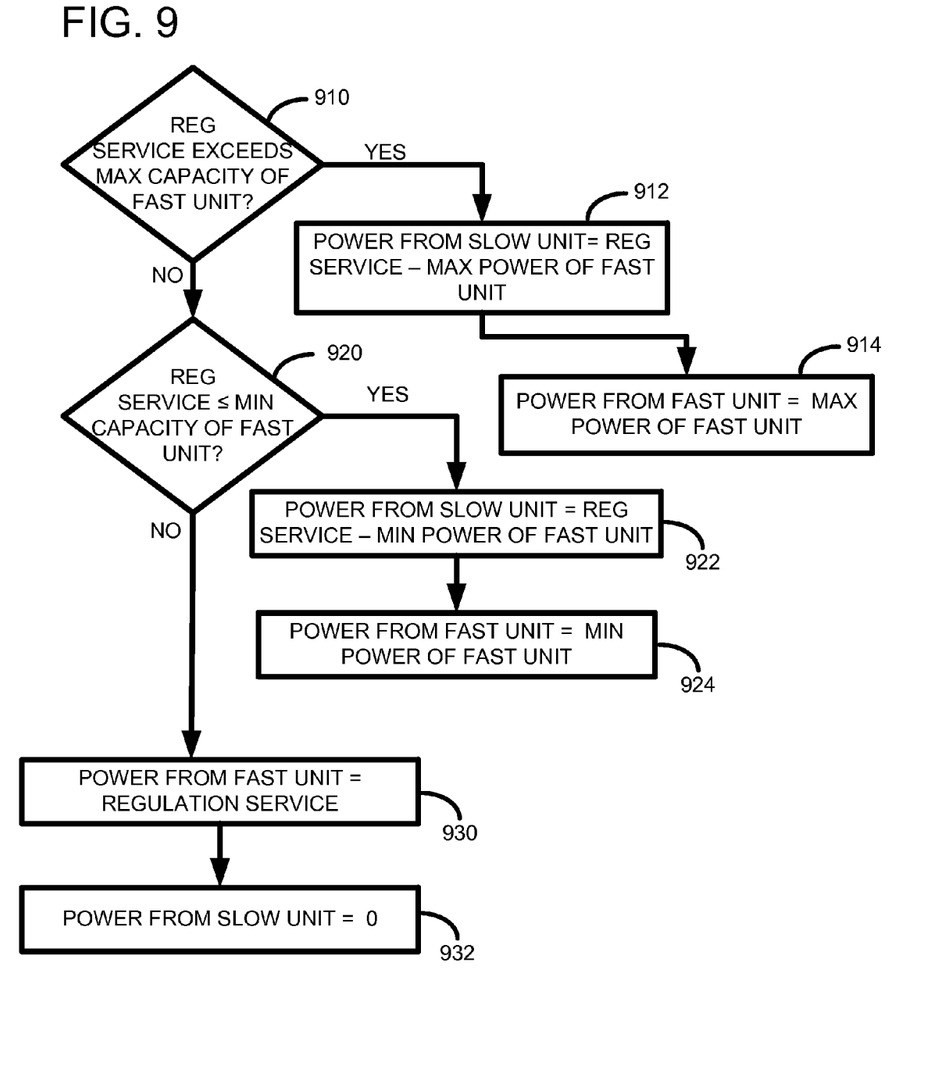
FIG. 9 is a flowchart of a method of actions performed in a normal mode of operation.

FIG. 9 shows a flowchart of a method that can be used when the fast unit is within a desired energy range, which is considered a normal mode of operation. This flowchart can be used as a continuation of FIGS. 6 and 7 when a process block says to track regulation using the second device. In decision block 910, a determination is made whether the regulation service exceeds a maximum capacity of the fast unit. If so, in process block 912, the power from the slow unit is set to the power of the regulation service less the maximum power output of the fast unit. Additionally, in process block 914, the power output from the fast unit is set to the maximum. Alternatively, if the regulation service is less than or equal to the minimum capacity of the fast unit (decision block 920), power from the slow unit is equal to the regulation service less the minimum power output from the fast unit (process block 922). The power output of the fast unit is then set to the minimum power output value (process block 924). If decision block 920 is answered in the negative, then in process block 930, power from the fast unit is set to the regulation service and power from the slow unit is set to zero (process block 932) meaning it remains at substantially constant power.

Figure 10:
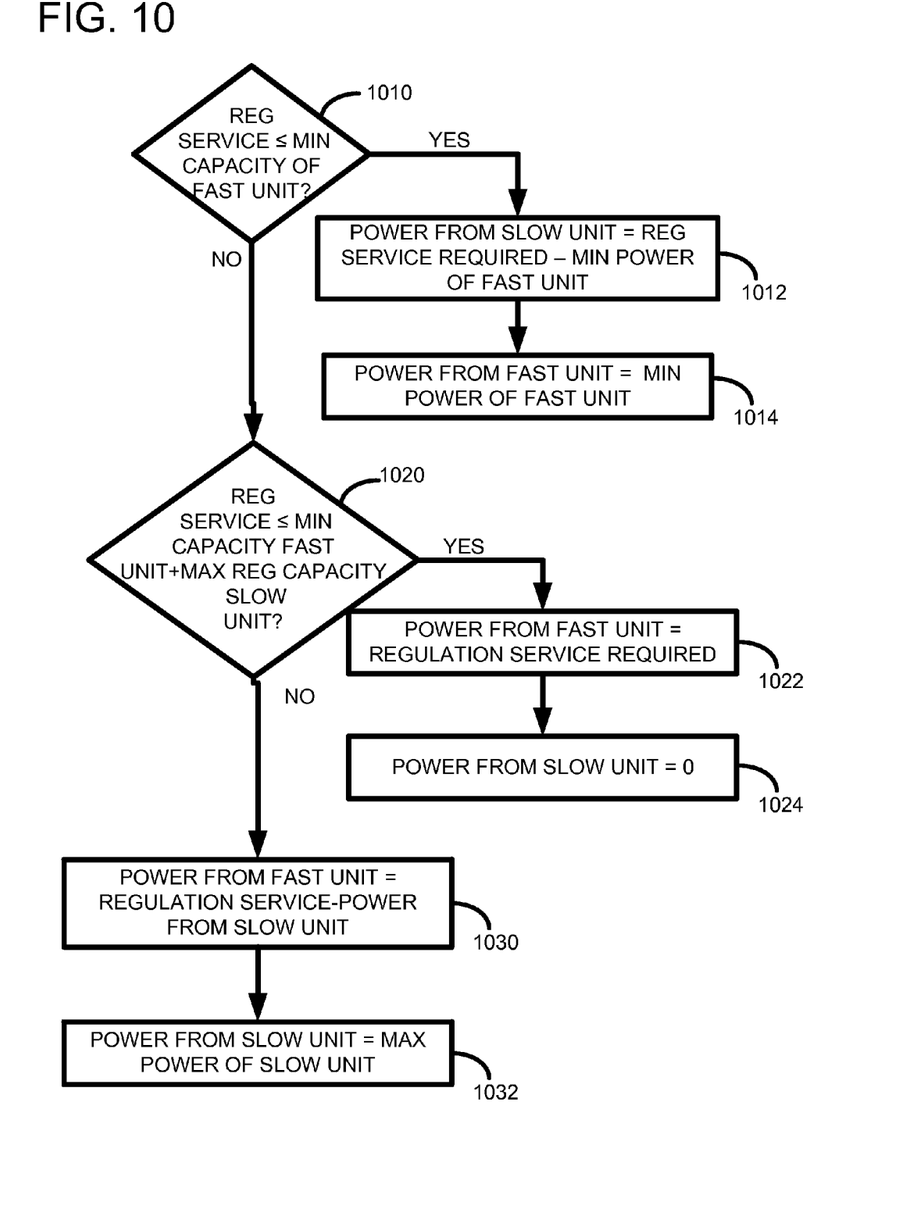
FIG. 10 is a flowchart of a method of actions performed for charging a storage unit in the hybrid energy system.

FIG. 10 is a flowchart of a method used wherein a slow unit assists in charging the fast unit. As with FIG. 9, this flowchart can be considered an extension of FIGS. 6 and 7 when the second device is charged. In decision block 1010, a check is made whether the regulation service is less than the minimum capacity of the fast unit. If so, in process block 1012, power of the slow unit is set to the regulation service required less the minimum power of the fast unit. Additionally, in process block 1014, the power from the fast unit is set to the minimum power of the fast unit. If decision block 1010 is answered in the negative, then in decision block 1020, a check is made whether the regulation service is less than or equal to the minimum capacity of the fast unit plus the maximum regulation power capacity of the slow unit. If so, in process block 1022, power from the fast unit is set equal to the regulation service required and the slow unit remains at substantially constant output power (process block 1024). If decision block 1020 is answered in the negative, then in process block 1030, power from the fast unit is set to the regulation service less the power of the slow unit and the power of the slow unit is set to the maximum regulation power capacity of the slow unit (process block 1032).

Figure 11:
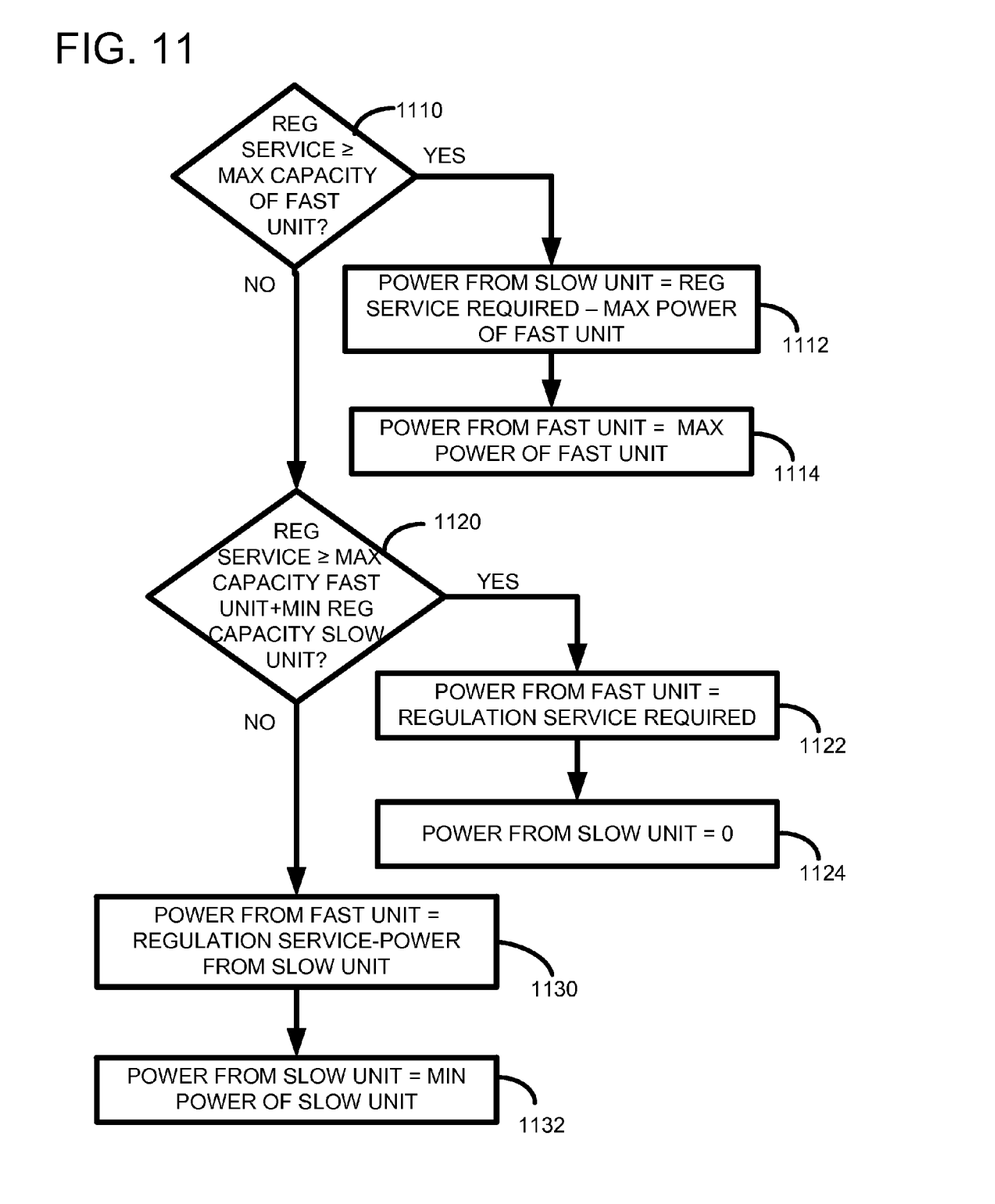
FIG. 11 is a flowchart of a method of actions performed for discharging a storage unit in the hybrid energy system.

FIG. 11 is a flowchart of a method used wherein a slow unit assists in discharging the fast unit. As with FIG. 9, this flowchart can be considered an extension of FIGS. 6 and 7 when the second device is discharged. In decision block 1110, a check is made whether the regulation service exceeds the maximum capacity of the fast unit. If so, then in process block 1112, the power of the slow unit is set to the regulation service less the maximum power of the fast unit and the power from the fast unit is set to a maximum (process block 1114). In decision block 1120, a check is made whether the regulation service is greater than or equal to the maximum capacity of the fast unit plus the minimum regulation power capacity of the slow unit. If so, then in process block 1122, power of the fast unit is set to the regulation service required, while the power output of the slow unit used for regulation service is set to 0. If decision block 1120 is decided in the negative, then in process block 1130 the power output of the fast unit is set to the regulation service required minus the regulation service required from the slow unit, which is set at the minimum regulation power capacity of the slow unit (process block 1132).

Thus, it can be seen in the disclosed embodiments, that based on the input signal, a control algorithm determines the optimal distribution of the requested regulation on the participating units. The algorithm calculates setpoints for each unit, which are then supplied to the generation units. The outcome is time series of slow power plant output, fast unit energy state, and fast unit power output. Two control algorithms have been developed for different capacity ratio between the fast and slow unit. If the fast regulation capacity is dominant, the slow unit only need provide energy support to the fast unit because the fast unit can take care of all the fluctuations of the regulation signal most of the time. But with the decrease of the capacity ratio between fast and slow units, the fast unit can have more fade time if it is controlled to meet all the fluctuations of the regulation signal. Therefore, a different control algorithm can split the signal into low frequency components and high frequency components. The fast unit picks up the high frequency components and the slow unit picks up the low frequency components. Thus both good regulation performance and less wear and tear are achieved.

Two energy bands are used to define the charging status of the fast unit. If the charging status of the fast unit is within the inner band, the fast unit is controlled to take the whole regulation signal except the capacity needed by the regulation signal is out of the capacity range of the fast unit. The charging status of fast unit between the inner energy band and outer energy band works like hysteresis. If the change direction of the fast unit charging status is going out of the inner energy band, no special action is needed until the charging status is out of the outer energy band. The slow unit will jump in to charge up or discharge the fast unit back to the inner energy band. If the slow regulation capacity is dominant, a low pass filter can be used to separate the regulation signal. The cut-off frequency of the low-pass filter is decided by both considering the capacity constraints and ramp capability of fast and slow units.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of providing regulation service using a hybrid energy storage system, comprising: providing a regulation service to an electrical power grid using a first energy unit and a second energy storage unit; receiving a regulation signal indicative of a change of output needed to meet an imbalance on the electrical power grid; classifying the second energy storage unit according to at least four energy thresholds including at least two inner thresholds and at least two outer thresholds, which define a capacity range of the second energy storage unit; determining whether the second energy storage unit is within a desired capacity range; and if the second energy storage unit is within the desired capacity range, using the second energy storage unit to substantially track changes in the regulation signal while the first energy unit remains at a substantially constant power output regardless of the changes in the regulation signal, wherein the regulation signal is tracked using the second energy storage unit if the second energy storage unit is within the desired capacity range.

2. The method of claim 1, wherein the first energy unit is an energy storage unit or an energy generation unit.

3. The method of claim 1, wherein if the second energy storage unit is not within the desired capacity range, adjusting the power output so that both the first energy unit and second energy storage unit track the changes in the regulation signal.

4. The method of claim 1, wherein the desired capacity range is determined by first and second energy thresholds of the second storage unit and wherein the first and second energy thresholds are dynamically modifiable.

5. The method of claim 4, wherein the first and second energy thresholds are modified based on characteristics of the regulation signal and based on feedback of a power output.

6. The method of claim 1, wherein the first energy unit includes one of the following: a hydroelectric dam, pumped storage, a combined cycle unit or a coal unit; and the second energy storage unit includes one of the following: a battery bank, a capacitor bank or a flywheel.

7. The method of claim 1, wherein the desired capacity range is between the at least two inner thresholds.

8. The method of claim 1, wherein the classifying includes determining whether the second energy storage unit is in a state of charging or discharging.

9. The method of claim 1, wherein if the second energy storage unit is not within a capacity range determined by the at least two outer thresholds, then either charging or discharging the second energy storage unit to bring it within the desired capacity range.

10. A method of providing power in a hybrid energy system, comprising: providing disparate energy devices including a first energy device and a second energy storage device; defining energy thresholds associated with the second energy storage device, wherein defining the energy thresholds includes defining at least two inner thresholds and at least two outer thresholds; dynamically modifying the energy thresholds in order to control a distribution of energy output between the first and second energy devices for providing a combined power output to an electrical power grid; determining whether the second energy storage device is within a desired capacity range as defined by the energy thresholds; and tracking a regulation signal using only the second energy storage device if the second energy storage device is within the desired capacity range.

11. The method of claim 10, further including determining a state of the second energy storage device as in a state of charging, discharging, or a neutral state and controlling an output of the second energy storage device based on the state.

12. The method of claim 10, further including tracking a regulation signal using both the first energy device and the second energy storage device only when the second energy storage device lacks energy to track the regulation signal on its own.

13. The method of claim 10, wherein the first energy storage device includes one of the following: a hydroelectric dam or a combined cycle units; and the second energy storage device includes one of the following: a battery or a flywheel.

14. A hybrid energy storage system, comprising: a first energy device and a second energy storage device, the first and second energy storage devices being of different types, that provide a combined power output for an electrical power grid; and a controller coupled to the first and second energy devices for adjusting a total power output of the first and second energy devices in response to a received regulation signal, the controller for adjusting only the second energy storage device to track the regulation signal while the second energy storage device is within a determined energy range, the first energy device remaining at a substantially constant power output regardless of the regulation signal while the second energy storage device is within the determined energy range; wherein the second energy storage device is classified according to at least four energy thresholds, the at least four energy thresholds including at least two inner thresholds and at least two outer thresholds, the at least four energy thresholds defining a capacity range of the second energy storage device.

15. The apparatus of claim 14, wherein the first energy device is a storage or a generation device and includes one of the following: a hydroelectric dam or a combined cycle units; and the second energy storage device includes one of the following: a battery or a flywheel.

16. The apparatus of claim 14, further including a memory for storing a flag that indicates whether the first energy device is in a state of assisting the second energy storage to charge or to discharge, or whether the first energy device remains neutral and the controller determines how to track the regulation signal based on the flag.

17. The apparatus of claim 14, further including a parameter selector coupled to the controller for dynamically modifying the energy thresholds associated with the second energy storage device, wherein the controller uses the energy thresholds for determining whether the second energy storage device is within the determined energy range.

18. The apparatus of claim 14, wherein if the second energy storage device is not within the determined energy range, adjusting the total power output so that both the first energy device and second energy storage device track the regulation signal.

* * * * *